United States Patent
Pedersen et al.

(10) Patent No.: US 10,120,513 B2
(45) Date of Patent: Nov. 6, 2018

(54) TOUCH SENSOR COMPENSATION CIRCUIT

(71) Applicant: Atmel Corporation, San Jose, CA (US)

(72) Inventors: Trond Jarle Pedersen, Trondheim (NO); Armin Prohaska, Württemberg (DE); Torgeir Fenheim, Mo i Rana (NO); Peter Kolb, Illertissen (DE)

(73) Assignee: Atmel Corporation, Chandler, AZ (US)

( * ) Notice: Subject to any disclaimer, the term of this patent is extended or adjusted under 35 U.S.C. 154(b) by 114 days.

(21) Appl. No.: 15/165,541

(22) Filed: May 26, 2016

(65) Prior Publication Data

US 2017/0344144 A1 Nov. 30, 2017

(51) Int. Cl.
*G06F 3/041* (2006.01)
*G06F 3/044* (2006.01)
*G06F 3/045* (2006.01)

(52) U.S. Cl.
CPC ............. *G06F 3/044* (2013.01); *G06F 3/041* (2013.01); *G06F 3/045* (2013.01); *G06F 3/0416* (2013.01); *G06F 3/0418* (2013.01); *G06F 2203/04101* (2013.01)

(58) Field of Classification Search
CPC ... G06K 9/0002; G06F 3/0325; G06F 3/0416; G06F 3/04883; G06F 2203/04101
See application file for complete search history.

(56) References Cited

U.S. PATENT DOCUMENTS

| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 8,723,824 B2 | 5/2014 | Myers |
| 2008/0309635 A1 | 12/2008 | Matsuo |
| 2009/0095542 A1* | 4/2009 | Moon ................. G06F 3/044 178/18.06 |
| 2009/0315854 A1 | 12/2009 | Matsuo |

(Continued)

FOREIGN PATENT DOCUMENTS

WO  WO 2012/129247 A2  9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Matthew Sim
(74) *Attorney, Agent, or Firm* — Baker Botts L.L.P.

(57) ABSTRACT

An apparatus includes an integrator circuit, a compensation circuit, and a sense circuit. The compensation circuit applies a positive charge and a negative charge to the integrator circuit during a first time period and a second time period respectively. The integrator circuit integrates a signal and the positive charge to produce a first sense signal. The signal is based on a charge at an electrode of a touch sensor. The integrator circuit integrates the signal and the negative charge to produce a second sense signal. The sense circuit detects a touch based on the first sense signal and the second sense signal.

18 Claims, 8 Drawing Sheets

(56) References Cited

U.S. PATENT DOCUMENTS

| | | |
|---|---|---|
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0256869 A1* | 10/2012 | Walsh .................. G06F 3/0416 345/174 |
| 2013/0076612 A1 | 3/2013 | Myers |

\* cited by examiner

TOUCH SENSOR COMPENSATION CIRCUIT

TECHNICAL FIELD

This disclosure generally relates to touch sensing technology.

BACKGROUND

According to an example scenario, a touch sensor detects the presence and position of a an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor is attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor. There are a number of different types of touch sensors, such as for example resistive touch sensors, surface acoustic wave touch sensors, and capacitive touch sensors.

In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance occurs within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Touch sensors can detect touches and/or objects by monitoring electric signals generated by an array of electrodes in the touch sensor. Each electrode is associated with a charge that produces an electric signal through the electrode. When a touch and/or an object is near the electrode the charge associated with the electrode changes, and as a result, the electric signal produced by that charge also changes. The touch sensor monitors the electric signal to determine when that electric signal changes. When the touch sensor detects that the electric signal has changed, the touch sensor determines that a touch and/or object is near the electrode.

One way to monitor the electric signal is to integrate the electric signal over a monitoring cycle. During each cycle, the touch sensor integrates the electric signal over that cycle and compares the integrated signal against a baseline signal to determine whether a change has occurred. If a change has occurred, the touch sensor can conclude that a touch and/or an object is near the electrode.

One issue that degrades the performance of the touch sensor is the parasitic capacitances of components of the touch sensor. These parasitic capacitances introduce fixed and/or direct current (DC) components to the electric signals communicated by the electrodes. When these DC components are amplified and/or integrated, they degrade the accuracy of the touch sensor by reducing the headroom available to monitor the integrated signals of the touch sensor. As a result, the signal to noise ratio of the touch sensor is decreased.

This disclosure contemplates a touch sensor that uses a compensation circuit to remove the fixed and/or DC component introduced by the parasitic capacitances. The compensation circuit adds and/or removes charge from an input of an integrator circuit in order to cancel and/or reduce the DC component of the electric signal. As a result, the amount of headroom available in which to monitor the integrated signal increases. Furthermore, the signal-to-noise ratio also increases. The touch sensor will be described generally, using FIGS. 1 and 2. The touch sensor will be described in more detail using FIGS. 3 through 7.

Figure 1:
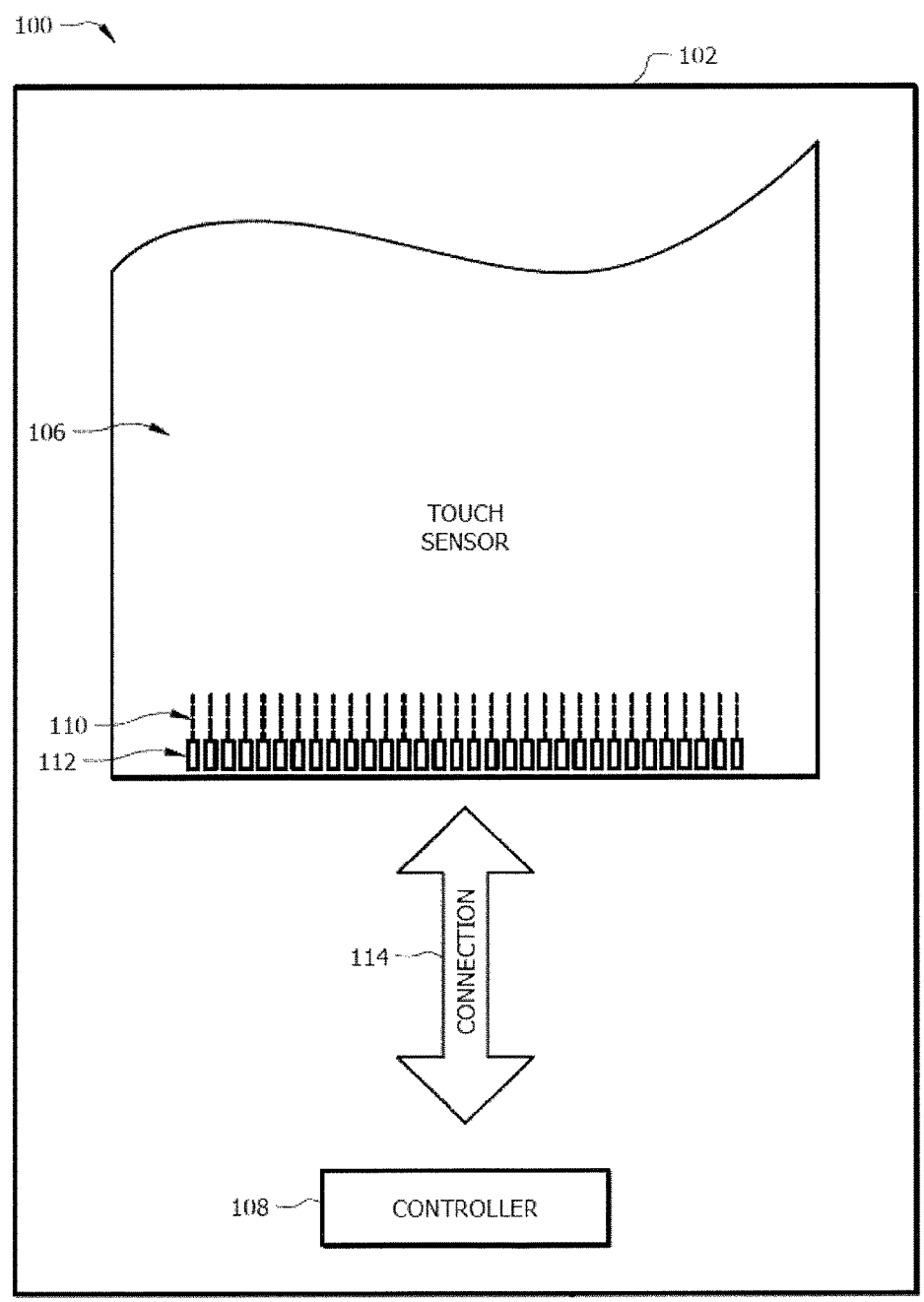
FIG. 1 illustrates an example system that includes a touch sensor, according to an embodiment of the present disclosure.

FIG. 1 illustrates an example system 100 that includes a touch sensor 102, according to an embodiment of the present disclosure. Touch sensor 102 includes touch sensor array 106 and touch sensor controller 108. Touch sensor array 106 and touch sensor controller 108 detect the presence and position of a touch or the proximity of an object within a touch-sensitive area of touch sensor array 106.

Touch sensor array 106 includes one or more touch-sensitive areas. In one embodiment, touch sensor array 106 includes an array of electrodes disposed on one or more substrates, which are made of a dielectric material. Reference to a touch sensor array can encompass both the electrodes of touch sensor array 106 and the substrate(s) on which they are disposed. Alternatively, reference to a touch sensor array may encompass the electrodes of touch sensor array 106, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material (at least in part) create the shape of an electrode, and the area of the shape are (at least in part) bounded by those cuts. In one embodiment, the conductive material of an electrode occupies approximately 100% of the area of its shape. For example, an electrode is made of indium tin oxide (ITO) and the ITO of the electrode occupies approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 106 constitute, in whole or in part, one or more macro-features of touch sensor array 106 array 10. One or more characteristics of the implementation of those shapes (such as, for example, the conductive materials, fills, or patterns within the shapes) constitute in whole or in part one or more micro-features of touch sensor array 106. One or more macro-features of a touch sensor array 106 may determine one or more characteristics of its functionality, and one or more micro-features of touch sensor array 106 may determine one or more optical features of touch sensor array 106, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor array 106. For example, the mechanical stack may include a first layer of optically clear adhesive (OCA) beneath a cover panel. The cover panel may be clear and made of a resilient material for repeated touching, such as for example glass, polycarbonate, or poly(methyl methacrylate) (PMMA). This disclosure contemplates cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 106 and touch sensor controller 108. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor array 106 may be made of polyethylene terephthalate (PET) or another material. This disclosure contemplates any substrate with portions made of any material(s). In one embodiment, one or more electrodes in touch sensor array 106 are made of ITO in whole or in part. Additionally or alternatively, one or more electrodes in touch sensor array 106 are made of fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any materials.

In one embodiment, touch sensor array 106 implements a capacitive form of touch sensing. In a mutual-capacitance implementation, touch sensor array 106 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 108) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 108 measures the change in capacitance. By measuring changes in capacitance throughout the array, touch sensor controller 108 determines the position of the touch or proximity within touch-sensitive areas of touch sensor array 106.

In a self-capacitance implementation, touch sensor array 106 may include an array of electrodes of a single type that may each form a capacitive node. When an object touches or comes within proximity of the capacitive node, a change in self-capacitance may occur at the capacitive node and touch sensor controller 108 measures the change in capacitance, for example, as a change in the amount of charge implemented to raise the voltage at the capacitive node by a predetermined amount. As with a mutual-capacitance implementation, by measuring changes in capacitance throughout the array, touch sensor controller 108 determines the position of the touch or proximity within touch-sensitive areas of touch sensor array 106. This disclosure contemplates any form of capacitive touch sensing.

In one embodiment, one or more drive electrodes together form a drive line running horizontally or vertically or in other orientations. Similarly, in one embodiment, one or more sense electrodes together form a sense line running horizontally or vertically or in other orientations. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In one embodiment, touch sensor array 106 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor array 106 may have drive electrodes disposed in a pattern on one side of a substrate and sense electrodes disposed in a pattern on another side of the substrate. Moreover, touch sensor array 106 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of touch sensor array 106 may indicate a touch or proximity input at the position of the capacitive node. Touch sensor controller 108 detects and processes the change in capacitance to determine the presence and position of the touch or proximity input. In one embodiment, touch sensor controller 108 then communicates information about the touch or proximity input to one or more other components (such as one or more central processing units (CPUs)) of a device that includes touch sensor array 106 and touch sensor controller 108, which may respond to the touch or proximity input by initiating a function of the device (or an application running on the device). Although this disclosure describes a particular touch sensor controller 108 having particular functionality with respect to a particular device and a particular touch sensor 102, this disclosure contemplates other touch sensor controllers having any functionality with respect to any device and any touch sensor.

In one embodiment, touch sensor controller 108 is implemented as one or more integrated circuits (ICs), such as for example general-purpose microprocessors, microcontrollers, programmable logic devices or arrays, application-specific ICs (ASICs). Touch sensor controller 108 comprises any combination of analog circuitry, digital logic, and digital non-volatile memory. In one embodiment, touch sensor controller 108 is disposed on a flexible printed circuit (FPC) bonded to the substrate of touch sensor array 106, as described below. The FPC may be active or passive. In one embodiment, multiple touch sensor controllers 108 are disposed on the FPC.

In an example implementation, touch sensor controller 108 includes a processor unit, a drive unit, a sense unit, and a storage unit. In such an implementation, the drive unit supplies drive signals to the drive electrodes of touch sensor array 106, and the sense unit senses charge at the capacitive nodes of touch sensor array 106 and provides measurement signals to the processor unit representing capacitances at the capacitive nodes. The processor unit controls the supply of drive signals to the drive electrodes by the drive unit and processes measurement signals from the sense unit to detect and process the presence and position of a touch or proximity input within touch-sensitive areas of touch sensor array 106. The processor unit may also track changes in the position of a touch or proximity input within touch-sensitive areas of touch sensor array 106. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 108 having a particular implementation with particular components, this disclosure contemplates touch sensor controller having other implementations with other components.

Tracks 110 of conductive material disposed on the substrate of touch sensor array 106 couple the drive or sense electrodes of touch sensor array 106 to connection pads 112, also disposed on the substrate of touch sensor array 106. As described below, connection pads 112 facilitate coupling of tracks 110 to touch sensor controller 108. Tracks 110 may extend into or around (e.g., at the edges of) touch-sensitive areas of touch sensor array 106. In one embodiment, particular tracks 110 provide drive connections for coupling touch sensor controller 108 to drive electrodes of touch sensor array 106, through which the drive unit of touch sensor controller 108 supplies drive signals to the drive electrodes, and other tracks 110 provide sense connections for coupling touch sensor controller 108 to sense electrodes of touch sensor array 106, through which the sense unit of touch sensor controller 108 senses charge at the capacitive nodes of touch sensor array 106.

Tracks 110 are made of fine lines of metal or other conductive material. For example, the conductive material of tracks 110 may be copper or copper-based and have a width of approximately 100 μm or less. As another example, the conductive material of tracks 110 may be silver or silver-based and have a width of approximately 100 μm or less. In one embodiment, tracks 110 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 110, touch sensor array 106 may include one or more ground lines terminating at a ground connector (which may be a connection pad 112) at an edge of the substrate of touch sensor array 106 (similar to tracks 110).

Connection pads 112 may be located along one or more edges of the substrate, outside a touch-sensitive area of touch sensor array 106. As described above, touch sensor controller 108 may be on an FPC. Connection pads 112 may be made of the same material as tracks 110 and may be bonded to the FPC using an anisotropic conductive film (ACF). In one embodiment, connection 114 includes conductive lines on the FPC coupling touch sensor controller 108 to connection pads 112, in turn coupling touch sensor controller 108 to tracks 110 and to the drive or sense electrodes of touch sensor array 106. In another embodiment, connection pads 112 are connected to an electromechanical connector (such as, for example, a zero insertion force wire-to-board connector). Connection 114 may or may not include an FPC. This disclosure contemplates any connection 114 between touch sensor controller 108 and touch sensor array 106.

Figure 2:
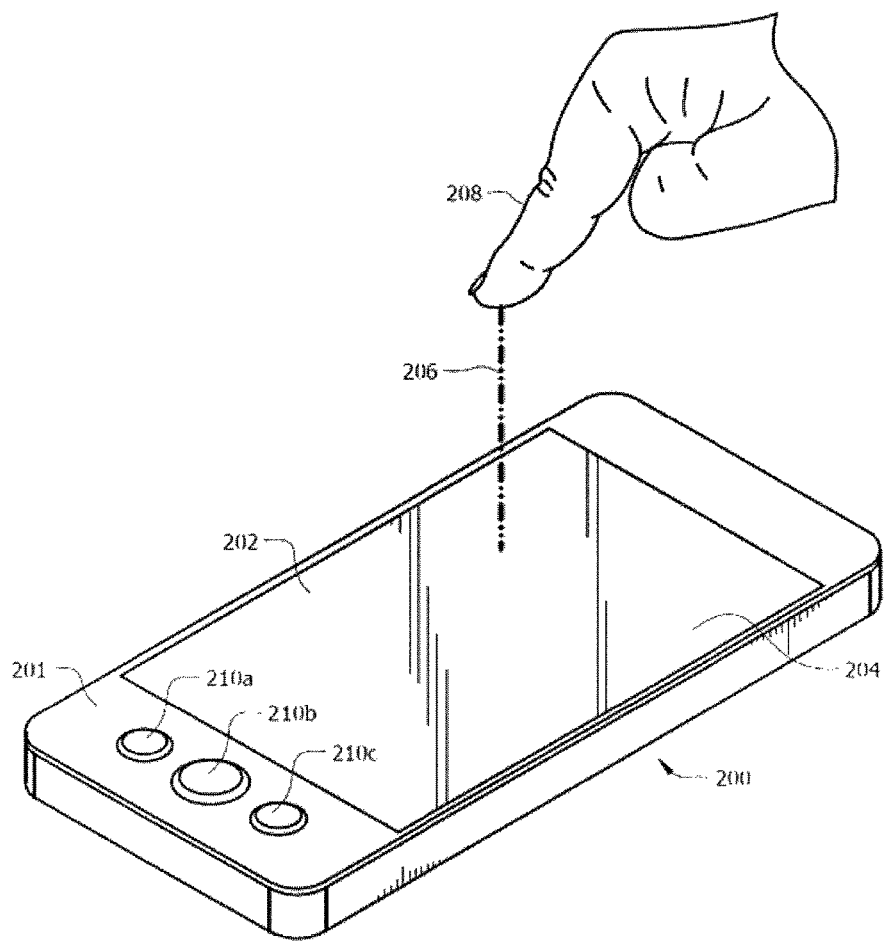
FIG. 2 illustrates an example device that houses the touch sensor, according to an embodiment of the present disclosure.

FIG. 2 illustrates an example device 200 that houses touch sensor 102, according to an embodiment of the present disclosure. Device 200 is any personal digital assistant, cellular telephone, smartphone, tablet computer, and the like. In one embodiment, device 200 includes other types of devices, such as automatic teller machines (ATMs), home appliances, personal computers, and any other such device having a touch screen. In the illustrated example, components of system 100 are internal to device 200. Although this disclosure describes a particular device 200 having a particular implementation with particular components, this disclosure contemplates any device 200 having any implementation with any components.

A particular example of device 200 is a smartphone that includes a housing 201 and a touch screen display 202 occupying a portion of a surface 204 of housing 201 of device 200. In an embodiment, housing 201 is an enclosure of device 200, which may contain internal components (e.g., internal electrical components) of device 200. Touch sensor 102 may be coupled, directly or indirectly, to housing 201 of device 200. Touch screen display 202 may occupy a significant portion or all of a surface 204 (e.g., one of the largest surfaces 204) of housing 201 of device 200. Reference to a touch screen display 202 includes cover layers that overlay the actual display and touch sensor elements of device 200, including a top cover layer (e.g., a glass cover layer). In the illustrated example, surface 204 is a surface of the top cover layer of touch screen display 202. In an embodiment, the top cover layer (e.g., a glass cover layer) of touch screen display 200 is considered part of housing 201 of device 200.

In one embodiment, the large size of touch screen display 202 allows the touch screen display 202 to present a wide variety of data, including a keyboard, a numeric keypad, program or application icons, and various other interfaces. In one embodiment, a user interacts with device 200 by touching touch screen display 202 with a stylus, a finger, or any other object in order to interact with device 200 (e.g., select a program for execution or to type a letter on a keyboard displayed on the touch screen display 202). In one embodiment, a user interacts with device 200 using multiple touches to perform various operations, such as to zoom in or zoom out when viewing a document or image. In some embodiments, such as home appliances, touch screen display 202 does not change or changes only slightly during device operation, and recognizes only single touches.

Users may interact with device 200 by physically impacting surface 204 (or another surface) of housing 201 of device 200, shown as impact 206, using an object 208, such as, for example, one or more fingers, one or more styluses, or other objects. In one embodiment, surface 204 is a cover layer that overlies touch sensor array 106 and a display of device 200. As described above, users may perform a series of physical impacts (e.g., a double-tap, a triple-tap, or another implemented series of impacts) to initiate a transition of touch sensor 102 (e.g., touch sensor controller 108) from a first power mode (e.g., a low power mode) to a second power mode (e.g., to wake up touch sensor 102 (e.g., touch sensor controller 108) of device 200). Impact sensor 104 detects impacts 206 and communicates an output signal indicative of the detected impacts 206. Touch sensor controller 108 (e.g., a monitoring component of touch sensor controller 108) receives the output signal from impact sensor 104 and initiates, based on the output signal corresponding to a predefined impact pattern (e.g., a double-tap occurring within a predetermined period of time), the transition of touch sensor 102 (e.g., touch sensor controller 108) from the first power mode to the second power mode.

Device 200 includes buttons 210, which may perform any purpose in relation to the operation of device 200. One or more of buttons 210 (e.g., button 210b) may operate as a so-called "home button" that, at least in part, indicates to device 200 that a user is preparing to provide input to touch sensor 102 of device 200. As described in greater detail below, an embodiment of the present disclosure may reduce or eliminate various reasons for including a "home button."

Figure 3A:
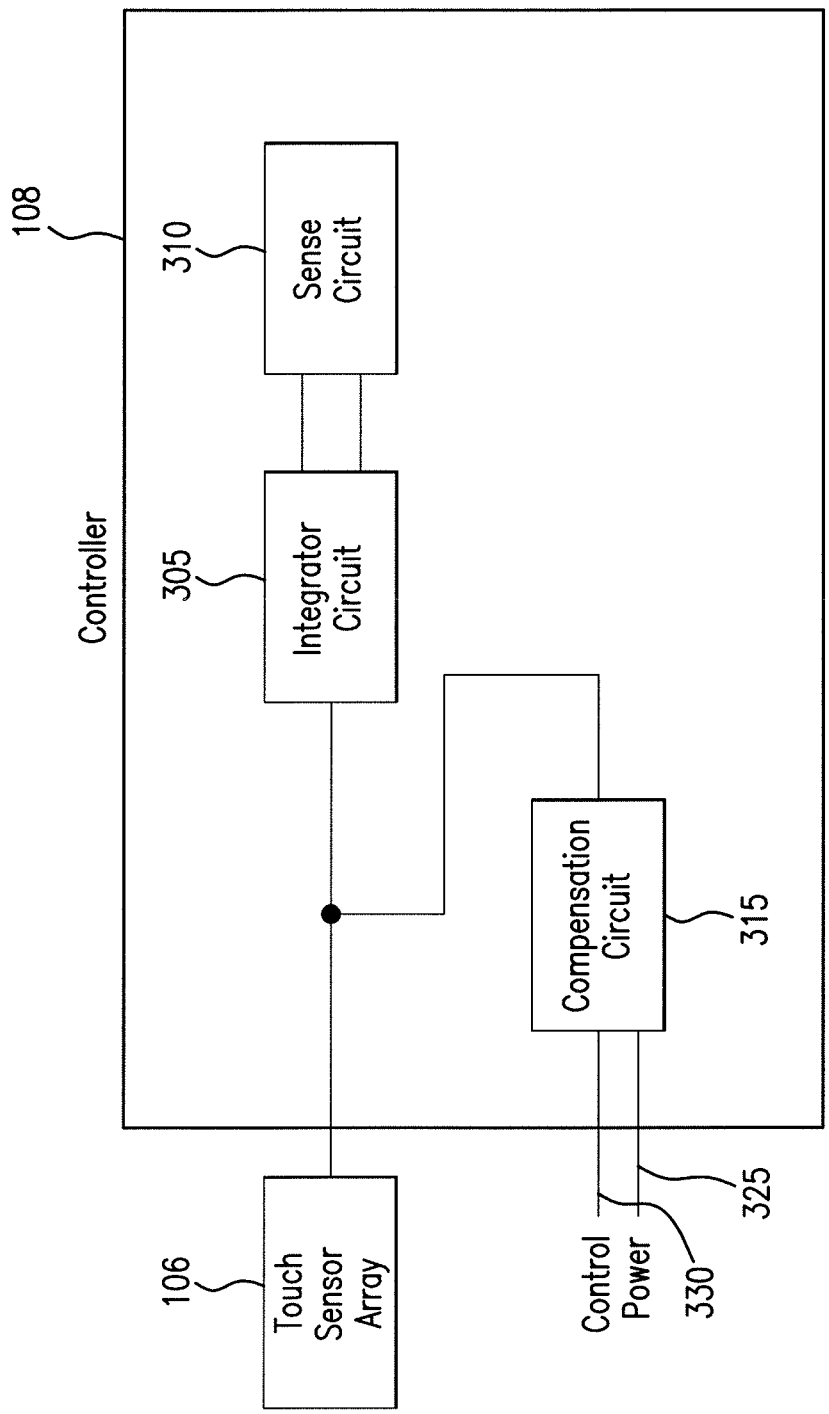
FIG. 3A illustrates an example touch sensor controller, according to an embodiment of the present disclosure.

FIG. 3A illustrates an example touch sensor controller 108 according to an embodiment of the present disclosure. As illustrated in FIG. 3A, touch sensor controller 108 includes an integrator circuit 305, a sense circuit 310, and a compensation circuit 315. In one embodiment, compensation circuit 315 increases the headroom available in which sense circuit 310 monitors electric signals from integrator circuit 305 by adding and/or removing charge to an input of integrator circuit 305. As a result, the electric signals from integrator circuit 305 can experience a greater change in voltage before hitting a rail (either ground or supply voltage). Therefore, the ability of touch sensor 102 to detect a touch improves.

Integrator circuit 305 is coupled to touch sensor array 106. Integrator circuit 305 receives an electric signal from an electrode of touch sensor array 106. The electric signal is based on a charge at the electrode. Integrator circuit 305 integrates the electric signal to produce two sense signals (e.g., a positive sense signal and a negative sense signal). These two sense signals are then monitored by sense circuit 310 to determine whether a touch occurred. For example, if one or more of the two sense signals deviates from a known or preselected baseline signal, it can be determined that a touch occurred near the electrode. As another example, if a difference between the two sense signals deviates from a known or preselected difference, it can be determined that a touch occurred near the electrode.

Sense circuit 310 receives the two sense signals produced by integrator circuit 305. Sense circuit 310 monitors the two sense signals from integrator circuit 305 to determine whether a touch occurred near the electrode of touch sensor array 106. For example, sense circuit 310 can first establish a baseline for each of the two sense signals. Then, sense circuit 310 monitors the two sense signals to see if they deviate from the baselines by a selected threshold. If one or more of the two sense signals deviate from the baseline by more than the threshold, then sense circuit 310 determines that a touch occurred near the electrode. As another example, sense circuit 310 can establish a baseline differential and/or difference between the two sense signals. Sense circuit 310 then monitors the difference between the two sent signals; if that difference deviates from the baseline difference by more than a selected threshold, then sense circuit 310 determines that a touch occurred near the electrode.

Pursuant to one example scenario, the performance and/or accuracy of sense circuit 310 may be degraded by the parasitic capacitances of components of touch sensor 102. These parasitic capacitances introduce DC components into the electric signal communicated by the electrodes of touch sensor array 106. When these DC components are integrated, it reduces the amount of headroom in which sense circuit 310 can monitor the two sense signals produced by integrator circuit 305. In other words, the DC components cause the two sense signals to be closer to the voltage rails (e.g., ground or the supply voltage rail). Therefore, the amount of voltage change that the sense signal can experience before hitting a voltage rail is decreased (less headroom), which allows for the gain of integrator circuit 305 to be increased thereby increasing the size of the touch signal. Because the reduced voltage change may be more difficult to detect, sense circuit 310 may not detect a touch in these circumstances. By removing the DC components, the sense signal can experience more voltage change before hitting a voltage rail (more headroom), which allows for the gain of integrator circuit 305 to be increased thereby increasing the size of the touch signal. As a result, the signal-to-noise ratio of the two sense signals is increased, thereby improving the touch detection capabilities of touch sensor 102.

Touch sensor controller 108 includes compensation circuit 315 that adds and/or removes charge to compensate and/or reduce the effect of the DC component caused by the parasitic capacitances of touch sensor 102. As illustrated in FIG. 3A, compensation circuit 315 is coupled to an input of integrator circuit 305. Compensation circuit 315 adds and/or removes charge from the signal produced by touch sensor array 106 before that signal is integrated by integrator circuit 305 (and/or during the integration phase(s)). As a result, the charge that compensation circuit 315 adds and/or removes compensates and/or reduces the DC component of the amplified signal. By reducing and/or removing the DC component, the two sense signals produced by integrator circuit 305 provide additional headroom in which sense circuit 310 can monitor the two sent signals thereby allowing system gain to be increased (e.g., there is additional headroom in which sense circuit 310 can monitor the actual touch signal, thereby allowing system gain to be increased). The operation of compensation circuit 315 will be discussed in more detail using FIGS. 4 through 7. This disclosure contemplates adding and removing charge to be equivalent to applying a positive and negative charge. For example, charge can be added by applying a positive charge and charge can be removed by applying a negative charge, or vice versa.

Compensation circuit 315 receives input through power line 325 and control lines 330. Power line 325 supplies charge to compensation circuit 315. In some embodiments, that charge is added to and/or removed from integrator circuit 305. A signal from control 330 controls whether compensation circuit 315 adds or removes charge.

In one embodiment, compensation circuit 315 is powered by a ground-based reference voltage that is substantially constant over an operating temperature range (e.g., a five degree Celsius range) of an operating temperature of touch sensor 102. Furthermore, the ground-based referenced voltage is substantially independent of a supply voltage used to power integrator circuit 305. For example, the ground-based reference voltage deviates by less than 1% over a one hundred and forty-five degree Celsius range (e.g., from −40 to 105 degrees Celcius) of operating temperature of touch sensor 102. As another example, the ground based reference voltage deviates by less than 1% of a change to the supply voltage that powers integrator circuit 305.

Figure 3B:
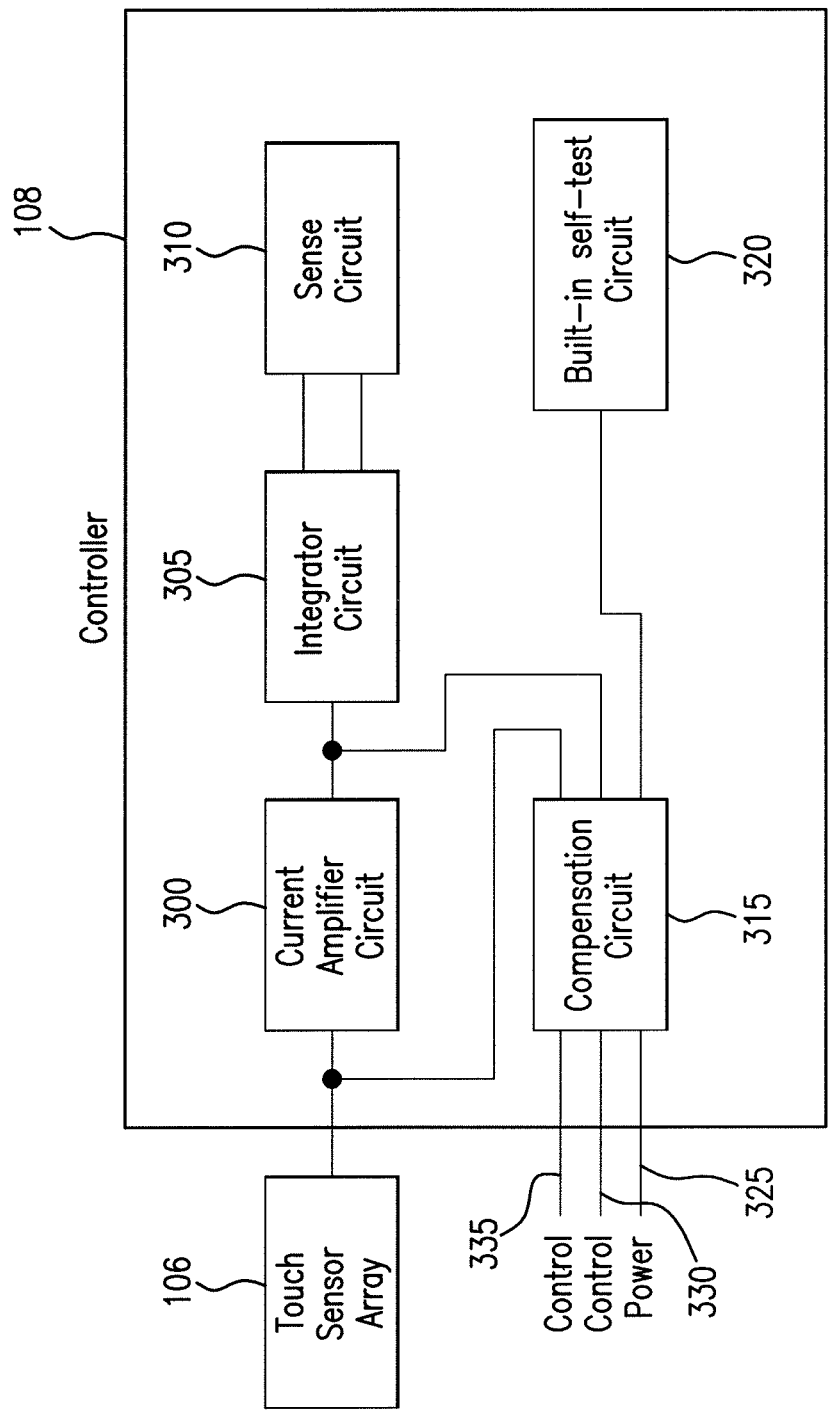
FIG. 3B illustrates an example touch sensor controller, according to an embodiment of the present disclosure.

FIG. 3B illustrates an example touch sensor controller 108 according to an embodiment of the present disclosure. Touch sensor controller 108 includes a current amplifier circuit 300, an integrator circuit 305, a sense circuit 310, a compensation circuit 315, and a built-in self-test circuit 320. The addition of current amplification circuit 300 improves the operation of touch sensor 102 by allowing scaling of the input signal. The built-in self-test circuit 320 reduces the test time and production cost of touch controller 108 by allowing less interaction with external test equipment. Furthermore, the operation of touch sensor 102 is improved because built-in-self-test circuit 320 allows for run-time calibration or diagnostic tests. The operation of the example touch sensor controller 108 of FIG. 3B is substantially similar to the operation of the example touch sensor controller 108 of FIG. 3A with a few noted differences.

As illustrated in FIG. 3B, current amplifier circuit 300 is coupled to touch sensor array 106 and integrator circuit 305. Current amplifier circuit 300 receives an electric signal from an electrode of touch sensor array 106. The signal is based on a charge at the electrode. Current amplifier circuit 300 amplifies the electric signal. This disclosure contemplates current amplifier circuit 300, including any number of components such as, for example, one or more current amplifiers and/or one or more differential amplifiers configured to amplify the electric signal from touch sensor array 106. Furthermore, it is contemplated that each electrode of touch sensor array 106 communicates an electric signal that is amplified by current amplifier circuit 300. In one embodiment, by amplifying the electric signal from the electrode, small changes and variations in the electric signal caused by a touch and/or object near the electrode become easier to detect. The current amplifier circuit 300 can be tuned and/or adjusted such that current amplifier circuit 300 provides a particular amount of gain to an electric signal at a first point in time and, based on the tuning and/or adjusting, a different amount of gain at a second point in time. Integrator circuit 305 receives the amplified electric signal from current amplifier circuit 300 and integrates the amplified electric signal to produce the two sense signals. It is further contemplated that amplifier circuit 300 has a gain less than one such that amplifier circuit 300 operates as an attenuator.

Additionally, compensation circuit 315 is also coupled to an input of current amplifier circuit 300. In this manner, compensation circuit 315 adds and/or removes charge from the electric signal received by current amplifier circuit 300. As a result, any DC component in the electric signal communicated by an electrode of touch sensor array 106 can be reduced and/or removed before being amplified by current amplifier circuit 300.

Furthermore, compensation circuit 315 is also coupled to an input of a built-in self-test circuit 320 in one embodiment. Compensation circuit 315 adds and/or removes charge to an input of built-in self-test circuit 320. The line over which compensation circuit 315 adds and/or removes charge from built-in self-test circuit 320 is referred to as a built-in self-test bus. In this manner, the charge that compensation circuit 315 adds and/or removes can be tested using built-in self-test circuit 320. As a result, self-testing of compensation circuit 315 can be performed by built-in self-test circuit 320, which simplifies production testing of touch sensor 102. Furthermore, built-in self-test circuit 320 can be used to perform diagnostic checks of touch sensor 102 during an operation of touch sensor 102. In one embodiment, compensation circuit 315 can be used to test other circuit blocks by applying a charge signal to the other blocks. Built-in-self-test circuit 320 provides a bus that connects compensation circuit 315 to the other blocks. For example, an input of another integrator circuit (if there are multiple integrators in the touch controller 108) can be connected to compensation circuit 315 through built-in self-test circuit.

Moreover, compensation circuit 315 receives additional input through control line 335. A signal from control line 335 controls to/from where compensation circuit 315 adds/removes charge (e.g., current amplifier circuit 300, integrator circuit 305, and/or built-in self-test circuit 320).

Additionally, current amplifier circuit 300 includes an input for a positive reference voltage and a negative reference voltage in one embodiment. The magnitude of the positive reference voltage and the magnitude of the negative reference voltage are substantially equal to the magnitude of the ground-based reference voltage used to power compensation circuit 315. For example, the magnitude of the positive reference voltage and the magnitude of the negative reference voltage deviate less than 1% from the magnitude of the ground-based reference voltage. As a result, the ground-based reference voltage, the positive reference voltage, and the negative reference voltage are kept independent of the supply voltage powering integrator circuit 305, which reduces the effect of supply voltage variation (e.g., across temperature ranges, battery lifetime, etc.) and supply voltage noise on the ground-based reference voltage, the positive reference voltage, and the negative reference voltage.

Figure 4:
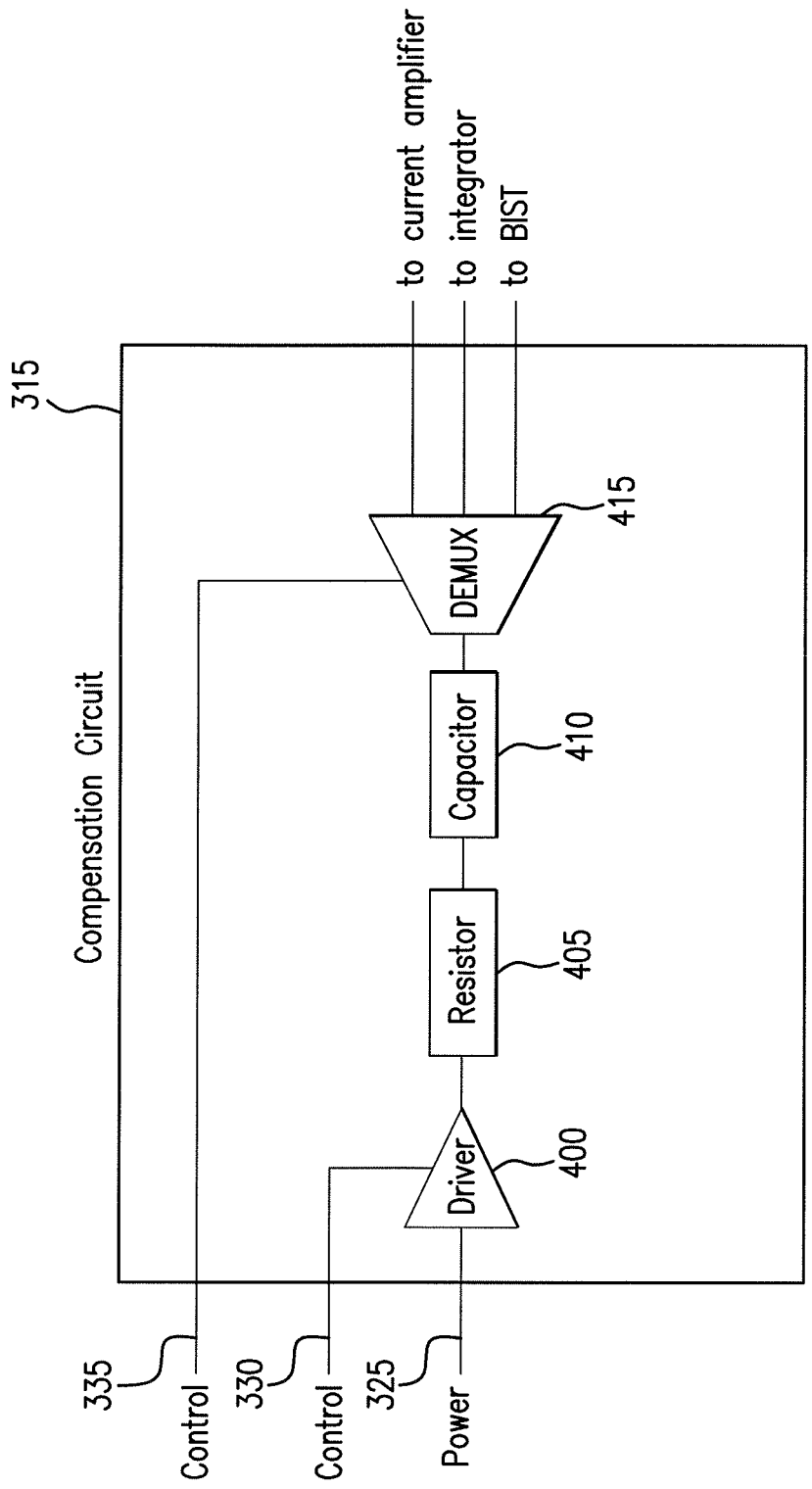
FIG. 4 illustrates an example compensation circuit, according to an embodiment of the present disclosure.

FIG. 4 illustrates an example compensation circuit 315 according to an embodiment of the present disclosure. As illustrated in FIG. 4, compensation circuit 315 includes a driver 400, a resistor 405, a capacitor 410, and a demultiplexer 415. In one embodiment, compensation circuit 315 adds and/or removes charge from various components of touch sensor controller 108 to increase the available headroom in which sense circuit 310 can monitor a first sense signal and a second sense signal produced by integrator circuit 305.

Driver 400 drives a positive charge or a negative charge through compensation circuit 315. Driver 400 receives a charge over power line 325 and a control signal over control line 330. Based on that control signal, driver 400 determines whether driver 400 drives a positive charge or a negative charge. For example, if the control signal indicates that driver 400 should be adding charge, then driver 400 will drive the charge received over power line 325. If the control signal indicates that driver 400 should be removing charge, driver 400 will instead draw charge to ground. In an embodiment, power line 325 carries a reference voltage set by a ground based reference system. The output of driver 400 is toggled between power line 325 and ground to provide the positive and negative charges (e.g., from ground to power line 325 to provide a positive charge and from power line 325 to ground to provide a negative charge). In one embodiment, the control signal is provided by touch sensor controller 108 rather than a component external to controller 108. The control signal is based on a phase of integrator circuit 305 in one embodiment. For example, during a negative integration phase of integrator circuit 305, the control signal causes driver 400 to drive a positive charge through compensation circuit 315. As another example, during a positive integration phase of integrator circuit 305, the control signal causes driver 400 to drive a negative charge through or remove charge from compensation circuit 315. In one embodiment, driver 400 uses a ground based reference voltage as supply in order to remove an effect of drift in a main supply voltage of the device.

Resistor 405 and capacitor 410 are coupled in series to driver 400. An input of resistor 405 is coupled to an output of driver 400 and an input of capacitor 410 is coupled to an output of resistor 405. Resistor 405 and capacitor 410 affect how quickly charge is added and/or removed through compensation circuit 315. For example, an impedance/resistance of resistor 405 affects how quickly electric energy is transferred to or from capacitor 410 and a capacitance of capacitor 410 affects how much energy is stored by capacitor 410. In one embodiment, resistor 405 is a variable resistor whose impedance/resistance can be adjusted. Furthermore, in one embodiment, capacitor 410 is a variable capacitor whose capacitance can be adjusted. By allowing resistor 405 and/or capacitor 410 to be variable, compensation circuit 315 can be configured to add and/or remove different amounts of charge at different rates depending on the state of touch sensor 102. For example, compensation circuit 315 can be configured to add a certain amount of charge during a negative integration phase of integrator circuit 305 and to remove a different amount of charge during a positive integration phase of integrator circuit 305. As another example, compensation circuit 315 can be configured to add a certain amount of charge when compensation circuit 315 is adding charge to an input of current amplifier circuit 300 and to remove a different amount of charge when compensation circuit 315 is removing charge from an input of integrator circuit 305.

Demultiplexer 415 switches the output of compensation circuit 315. An input of demultiplexer 415 is coupled to an output of capacitor 410. Furthermore, demultiplexer 415 receives a control signal over control line 335. In one embodiment, the control signal is provided by touch sensor controller 108 instead of a component external to controller 108. Demultiplexer 315 includes multiple outputs: an output to current amplifier circuit 300, an output to integrator circuit 305, and an output to built-in self-test circuit 320. Depending on the control signal received over control line 335, demultiplexer 315 will send the output of capacitor 410 to one of the outputs. For example, during a self-diagnostic test, the control signal causes demultiplexer 415 to direct the output of capacitor 410 to built-in self-test circuit 320. As another example, during an integration phase of integrator circuit 305, the control signal causes demultiplexer 415 to direct the output of capacitor 410 to integrator circuit 305 and/or current amplifier circuit 300.

Figure 5:
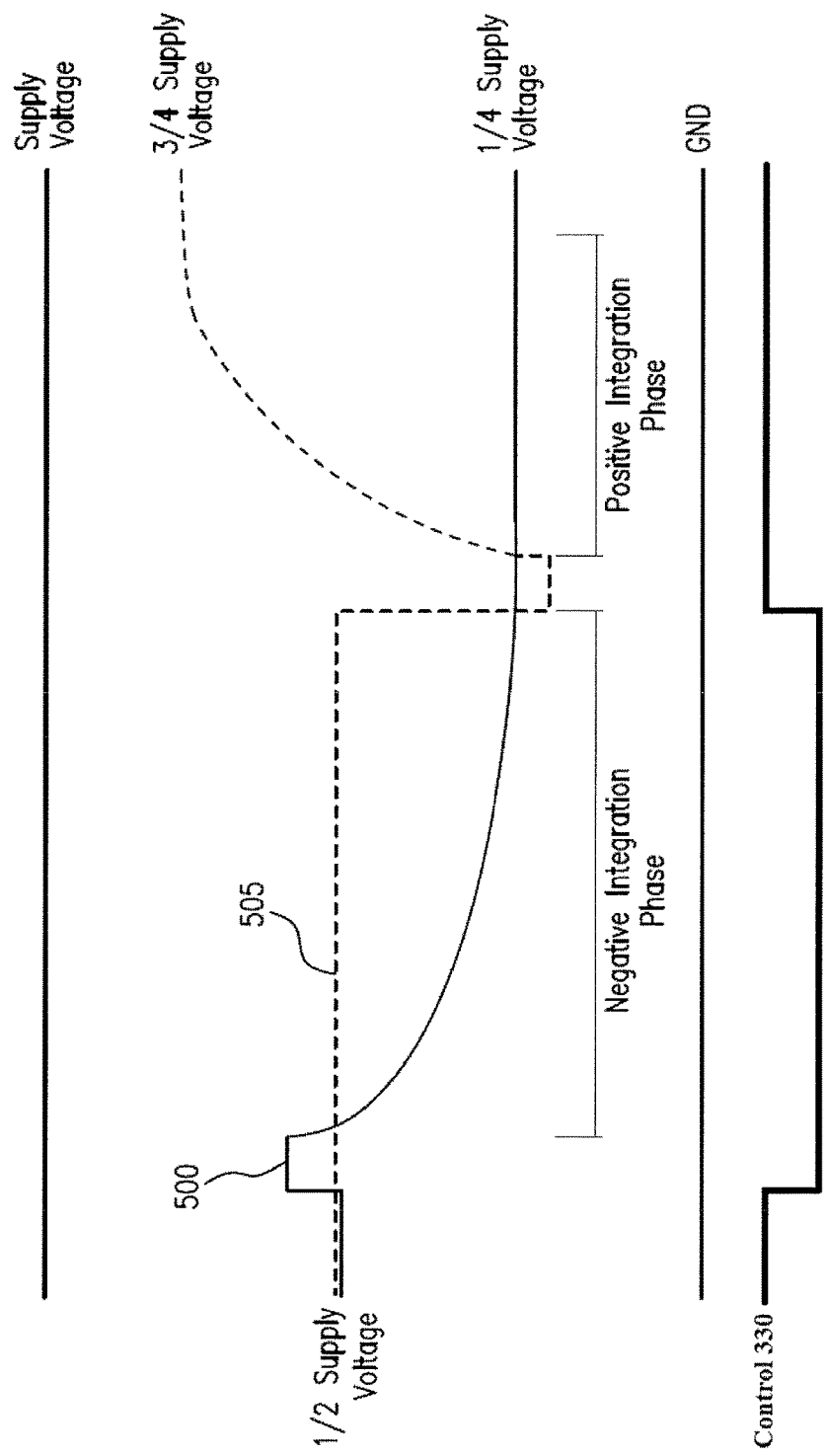
FIG. 5 illustrates an example signal diagram showing a first example pre-charging of an integrator circuit using a compensation circuit, according to an embodiment of the present disclosure.

FIG. 5 illustrates an example signal diagram for pre-charging an integrator circuit 305 using a compensation circuit 315 according to an embodiment of the present disclosure. As illustrated in FIG. 5, charge can be added and/or removed from an input of integrator circuit 305 during the initialization of integrator circuit 305.

After initialization of integrator circuit 305, a negative integration phase and a positive integration occurs. During each phase, integrator circuit 305 integrates an input signal provided by touch sensor array 106 and/or current amplifier circuit 300 to produce a first sense signal 500 and a second sense signal 505. Initialization prepares integrator circuit 305 and touch sensor controller 108 to detect touches on or near touch sensor array 106. This disclosure contemplates initialization occurring before touch sensor controller 108 measures for a touch.

As illustrated in FIG. 5, charge is added and/or removed from the signal before integrator circuit 305 enters the negative integration phase and the positive integration phase. For example, before the negative integration phase, compensation circuit 315 adds charge to the signal. After charge is added, integrator circuit 305 performs a negative integration on the signal to produce first sense signal 500. The signal starts at half the supply voltage. Then, shortly before the negative integration phase, the signal increases in voltage due to the added charge. Then, the signal gradually decreases to a quarter of the supply voltage during the negative integration phase. Integrator circuit 305 then holds first sense signal 500 at a quarter of the supply voltage. As a result, the available headroom in first sense signal 500 increases thereby allowing for a higher system gain that increases the size of a touch signal, making it easier to detect.

To produce second sense signal 505, integrator circuit 305 performs a positive integration during the positive integration phase. Before the positive integration phase, compensation circuit 315 removes charge from the signal. As seen in FIG. 5, the signal starts at half supply voltage. Then, before the positive integration phase, the voltage of the signal drops as charge is removed. Then, integrator circuit 305 performs the positive integration on the signal and the signal gradually increases to three quarters supply voltage. Integrator circuit 305 then holds second sense signal 505 at three quarters supply voltage. As a result, the available headroom in second sense signal 505 increases thereby allowing for a higher system gain that increases the size of a touch signal, making it easier to detect.

In one embodiment, the signal over control line 330 is used to add and/or remove an amount of charge that compensates offset errors in the current amplifier circuit 300. Current amplifier circuit 300 may add and/or remove an amount of error charge during the integration phase due to internal offset. Compensation circuit 315 and control line 330 can cancel this error charge so that the effect of offset in current amplifier circuit 300 is not visible on an output of integrator circuit 305.

Figure 6:
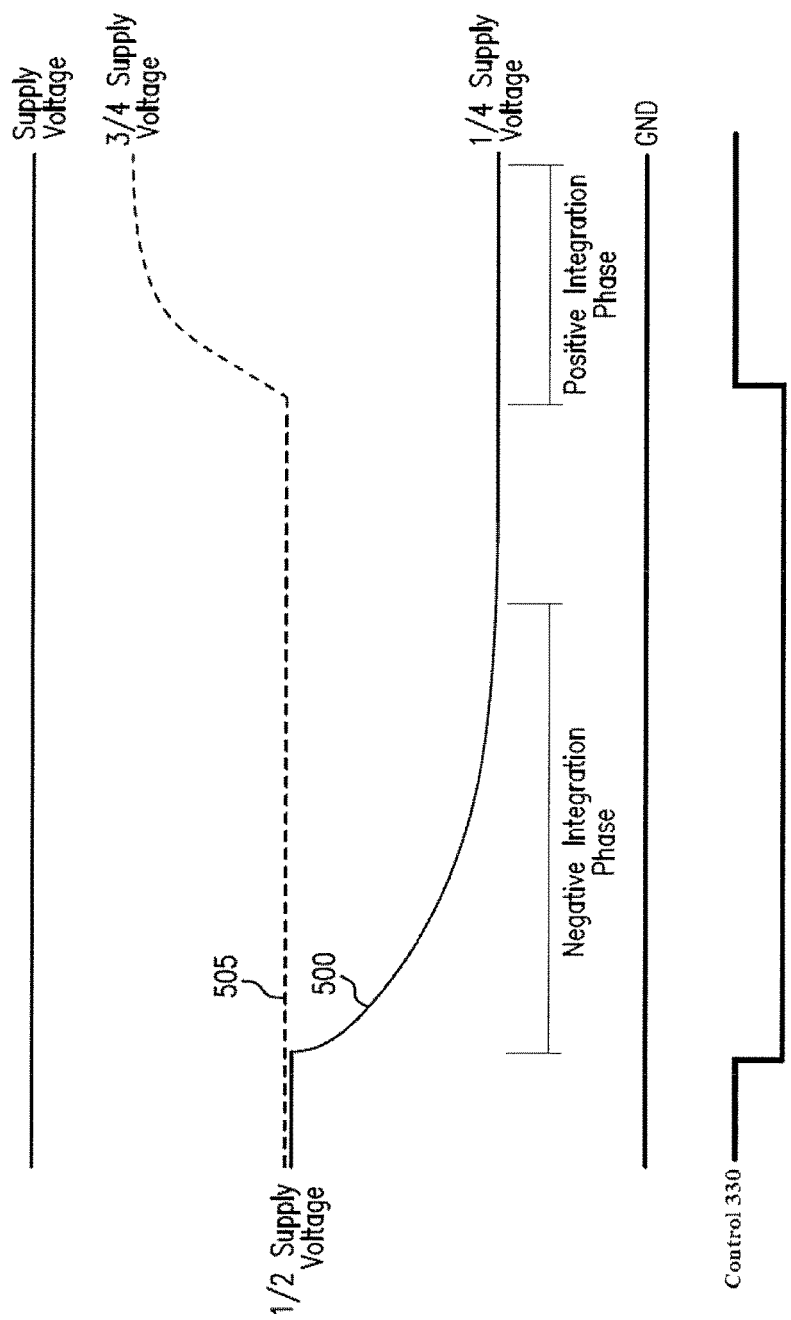
FIG. 6 illustrates an example signal diagram showing a second example pre-charging of an integrator circuit using a compensation circuit, according to an embodiment of the present disclosure.

FIG. 6 illustrates an example signal diagram for pre-charging an integrator circuit 305 using a compensation circuit 315 according to an embodiment of the present disclosure. As illustrated in FIG. 6, instead of adding and/or removing charge from the electric signal before the negative integration phase and the positive integration phase, compensation circuit 315 can add and/or remove charge during the negative integration phase and the positive integration phase.

As seen in FIG. 6, first sense signal 500 is produced by performing the negative integration and by adding charge to the signal during the negative integration phase. As shown in FIG. 6, the electric signal starts at half supply voltage and then the negative integration is performed during the negative integration phase. Furthermore, charge is added to the electric signal during the negative integration phase. As a result, first sense signal 500 still ends up at quarter supply voltage. As a result of charge compensation, the system gain may be increased without first sense signal 500 hitting a rail (e.g., ground or supply) during the integration phase.

Similarly, second sense signal 505 is produced by performing a positive integration and by removing charge during the positive integration phase. As a result, the electric signal starts at half supply voltage and then the positive integration is performed during the positive integration phase. Furthermore, charge is removed from the electric signal during the positive integration phase. As a result, second sense signal 505 ends up at three quarters supply voltage. As a result of charge compensation, the system gain may be increased without second sense signal 505 hitting a rail (e.g., ground or supply) during the integration phase.

This disclosure contemplates integrator circuit 305 and compensation circuit 315 performing the pre-charging routines described using FIGS. 5 and 6 each time before sense circuit 310 measures first sense signal 500 and second sense signal 505 to determine whether a touch occurred. For example, after sense circuit 310 determines that no touch has occurred, integrator circuit 305 can reset first sense signal 500 and second sense signal 505 back to half supply voltage. Then, compensation circuit 315 adds and/or removes charge and the negative and positive integration phases occur again. Then, sense circuit 310 can measure first sense signal 500 and second sense signal 505 again to determine whether a touch occurred.

Although this disclosure describes integrator circuit 305 producing first sense signal 500 at quarter supply voltage and second sense signal 505 at three quarters supply voltage, this disclosure contemplates integrator circuit 305 producing first sense signal 500 and second sense signal 505 at any voltage. For example, integrator circuit 305 could produce first sense signal 500 at one third supply voltage and second sense signal 505 at two thirds supply voltage. This disclosure also contemplates compensation circuit adding and/or removing any amount of charge from components of touch sensor controller 108.

Figure 7:
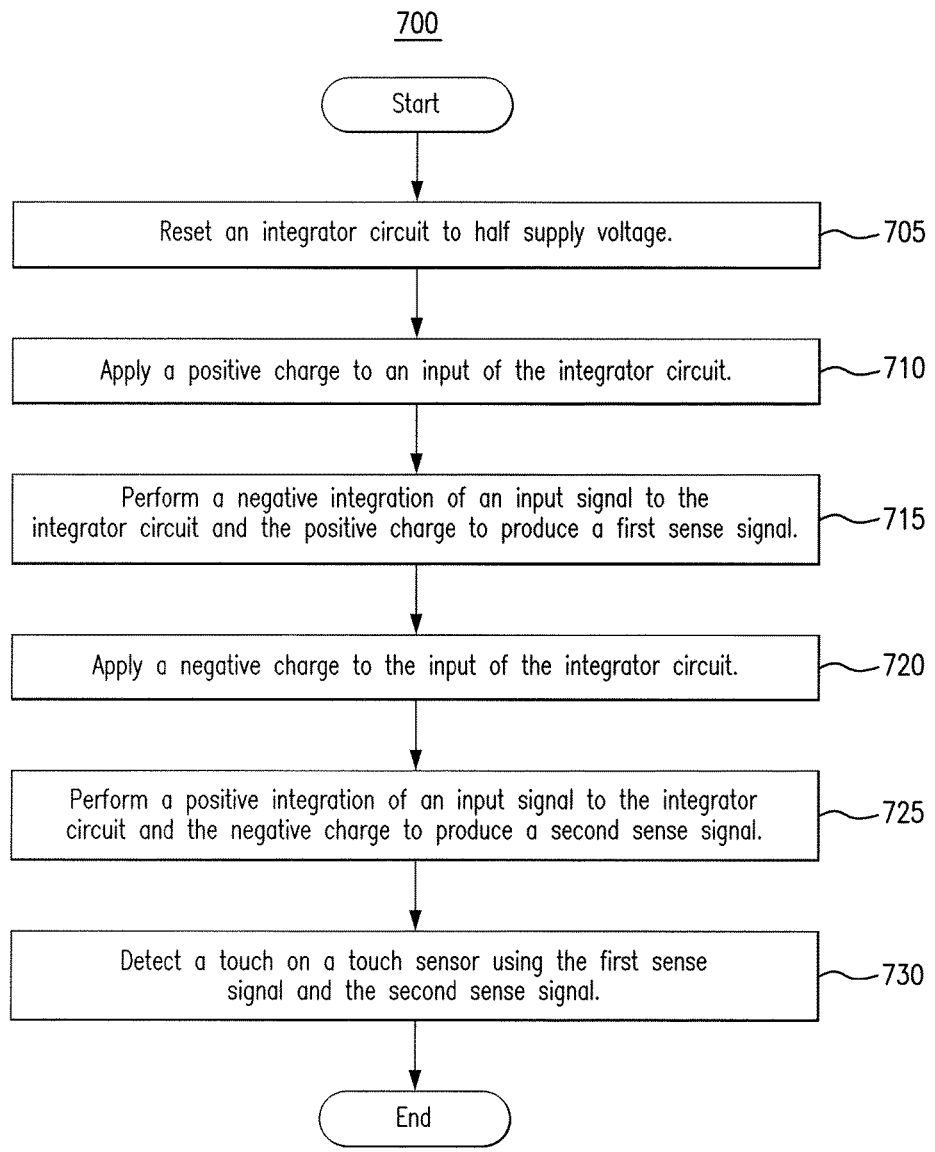
FIG. 7 illustrates an example method for detecting a touch, according to an embodiment of the present disclosure.

FIG. 7 illustrates an example method 700 for detecting a touch according to an embodiment of the present disclosure. In one embodiment, touch sensor controller 108 performs method 700. By performing method 700, touch sensor controller increases the amount of headroom in which touch sensor controller 108 monitors a first and second sense signals, which improves the accuracy of touch sensor 102. For example, an actual touch may change the voltage at which first sense signal 500 and/or second sense signal 505 end up (e.g., quarter supply voltage or three-quarters supply voltage). The increased headroom allows for a wider signal range available for detecting the touch signal.

Controller 108 resets an integrator circuit to half supply voltage in step 705. By resetting the integrator circuit to half supply voltage, two sense signals at half supply voltage are produced. Then, in step 710 controller 108 applies a positive charge to an input of the integrator circuit. In step 715, controller 108 performs a negative integration of an input signal to the integrator circuit and the positive charge to produce a first sense signal. In one embodiment, the first sense signal is reduced from half supply voltage to quarter supply voltage as a result of the negative integration.

In step 720, controller 108 applies a negative charge to the input of the integrator circuit. Then in step 725, controller 108 performs a positive integration of an input signal to the integrator circuit and the negative charge to produce a second sense signal. In one embodiment, the second sense signal increases from half supply voltage to three quarters supply voltage as a result of the positive integration. Controller 108 concludes in step 730 by detecting a touch on a touch sensor using the first sense signal and the second sense signal. In one embodiment, by performing method 700 controller 108 increases the headroom available to detect a touch using the first sense signal and the second sense signal.

In one embodiment, an apparatus includes an integrator circuit, a compensation circuit, and a sense circuit. The integrator circuit integrates a signal to produce a first sense signal and a second sense signal. The signal is based on a charge at an electrode of a touch sensor. The compensation circuit includes a driver, a resistor, and a capacitor. The resistor is coupled to an output of the driver. The capacitor is coupled to the resistor and to an input of the integrator circuit. The sense circuit is coupled to an output of the integrator circuit. The sense circuit detects a touch using the first sense signal and the second sense signal. In one embodiment, the compensation circuit further includes a demultiplexer coupled to the capacitor and the capacitor is further coupled to an input of a current amplifier circuit through the demultiplexer. The current amplifier is coupled to the input of the integrator circuit. In one embodiment, the compensation circuit further includes a demultiplexer coupled to the capacitor and the capacitor is further coupled to a built-in self-test bus. In one embodiment, the capacitor is a variable capacitor. In one embodiment, the resistor is a variable resistor. In one embodiment, the first sense signal is produced during a negative integration phase of the integrator circuit and the second sense signal is produced during a positive integration phase of the integrator circuit. In one embodiment, the apparatus includes a current amplifier circuit coupled to the input of the integrator. The compensation circuit is powered by a ground-based reference voltage that is substantially constant over the operating temperature range of touch sensor 102 (e.g., −40 to 105 degrees Celcius) and substantially independent of a supply voltage used to power the integrator circuit. The current amplifier circuit includes an input for a positive reference voltage and a negative reference voltage. The magnitude of the positive reference voltage and the magnitude of the negative reference voltage are substantially equal to the magnitude of the ground-based reference voltage. In one embodiment, the compensation circuit adds charge to the amplified signal before a negative integration phase of the integrator circuit and the compensation circuit removes charge from the amplified signal before a positive integration phase of the integrator circuit. In one embodiment, the compensation circuit adds charge to the amplified signal during a negative integration phase of the integrator circuit and the compensation circuit removes charge from the amplified signal during a positive integration phase of the integrator circuit.

In one embodiment, a non-transitory computer-readable medium includes logic that when executed by a processor, causes the processor to apply, through a compensation circuit, a positive charge to an input of an integrator circuit. The integrator circuit integrates a signal communicated by an electrode of a touch sensor and the positive charge to produce a first sense signal. The signal is based on a charge at an electrode of a touch sensor. The logic further causes the processor to apply, through the compensation circuit, a negative charge to the input of the integrator circuit. The integrator circuit integrates the signal and the negative charge to produce a second sense signal. The logic also causes the processor to detect a touch using the first sense signal and the second sense signal. In one embodiment, the logic further causes the processor to apply, through the compensation circuit, a positive charge to an input of a current amplifier circuit coupled to the input of the integrator circuit and to apply through the compensation circuit, a negative charge to the input of the current amplifier circuit. In one embodiment, the logic further causes the processor to apply, through the compensation circuit, a positive charge to a built-in self-test bus and to apply, through the compensation circuit, a negative charge to the built-in self-test bus. In one embodiment, the first sense signal is produced during a negative integration phase of the integrator circuit and the second sense signal is produced during a positive integration phase of the integrator circuit. In one embodiment, the positive charge is applied to the input of the integrator circuit before a negative integration phase of the integrator circuit and the negative charge is applied to the input of the integrator circuit before a positive integration phase of the integrator circuit. In one embodiment, the positive charge is applied to the input of the integrator circuit during a negative integration phase of the integrator circuit and the negative charge is applied to the input of the integrator circuit during a positive integration phase of the integrator circuit.

Embodiments of the present disclosure provide one or more technical advantages. For example, one embodiment improves the accuracy of touch sensor 102 by increasing the headroom available to monitor first and second sense signals, which also improves the signal-to-noise ratio of electric signals provided by a touch sensor array. As yet another example, one embodiment allows for self-testing and runtime diagnostic testing of touch sensor controller 108 through a built-in self-test bus. Certain embodiments of the invention may include none, some, or all of the above technical advantages. One or more other technical advantages may be readily apparent to one skilled in the art from the figures, descriptions, and claims included herein.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, components referred to as being "coupled" includes the components being directly coupled or indirectly coupled.

This disclosure encompasses a myriad of changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   an integrator circuit;
   a compensation circuit distinct from and coupled to the integrator circuit, the compensation circuit comprising:
      a driver;
      a resistor coupled in series with the driver;
      a capacitor coupled in series with the resistor; and
      a demultiplexer coupled in series with the capacitor, the driver operable to:
drive, during a first time period, a positive charge through the resistor, capacitor, and demultiplexer to the integrator circuit, the integrator circuit operable to integrate a signal and the positive charge to produce a first sense signal, the signal based on a charge at an electrode of a touch sensor; and
drive, during a second time period, a negative charge through the resistor, capacitor, and demultiplexer to the integrator circuit, the integrator circuit further operable to integrate the signal and the negative charge to produce a second sense signal; and
a sense circuit operable to detect a touch based on the first sense signal and the second sense signal.

2. The apparatus of claim 1, wherein the resistor is a variable resistor.

3. The apparatus of claim 1, wherein the capacitor is a variable capacitor.

4. The apparatus of claim 1, wherein the driver uses a ground based reference voltage as a supply to remove an effect of drift in a main supply voltage.

5. The apparatus of claim 1, wherein an output of the demultiplexer is coupled to the integrator circuit, an input of the demultiplexer is coupled to the capacitor.

6. The apparatus of claim 1, wherein an output of the demultiplexer is coupled to a current amplifier circuit, an input of the demultiplexer is coupled to the capacitor.

7. The apparatus of claim 1, wherein an output of the demultiplexer is coupled to a built-in self-test bus, an input of the demultiplexer is coupled to the capacitor.

8. The apparatus of claim 1 further comprising a current amplifier circuit coupled to the integrator circuit and the compensation circuit.

9. The apparatus of claim 1 further comprising a built-in self-test bus coupled to the compensation circuit.

10. A device comprising:
a touch sensor array;
an integrator circuit;
a compensation circuit distinct from and coupled to the integrator circuit, the compensation circuit comprising:
a driver;
a resistor coupled in series with the driver;
a capacitor coupled in series with the resistor; and
a demultiplexer coupled in series with the capacitor,
the driver operable to:
drive, during a first time period, a positive charge through the resistor, capacitor, and demultiplexer to the integrator circuit, the integrator circuit operable to integrate a signal and the positive charge to produce a first sense signal, the signal based on a charge at an electrode of the touch sensor array; and
drive, during a second time period, a negative charge through the resistor, capacitor, and demultiplexer to the integrator circuit, the integrator circuit further operable to integrate the signal and the negative charge to produce a second sense signal; and
a sense circuit operable to detect a touch based on the first sense signal and the second sense signal.

11. The device of claim 10, wherein the resistor is a variable resistor.

12. The device of claim 10, wherein the capacitor is a variable capacitor.

13. The device of claim 10, wherein the driver uses a ground based reference voltage as a supply to remove an effect of drift in a main supply voltage.

14. The device of claim 10, wherein an output of the demultiplexer is coupled to the integrator circuit, an input of the demultiplexer is coupled to the capacitor.

15. The device of claim 10, wherein an output of the demultiplexer is coupled to a current amplifier circuit, an input of the demultiplexer is coupled to the capacitor.

16. The device of claim 10, wherein an output of the demultiplexer is coupled to a built-in self-test bus, an input of the demultiplexer is coupled to the capacitor.

17. The device of claim 10, further comprising a current amplifier circuit coupled to the integrator circuit and the compensation circuit.

18. The device of claim 10, further comprising a built-in self-test bus coupled to the compensation circuit.

* * * * *